Aug. 20, 1968  S. W. BENGTSSON  3,397,480

WINDERS FOR FISHING LINES

Filed Aug. 30, 1965

INVENTOR.
SIGURD WALTER BENGTSSON
BY
Linton and Linton
ATTORNEYS

Aug. 20, 1968  S. W. BENGTSSON  3,397,480
WINDERS FOR FISHING LINES

Filed Aug. 30, 1965  2 Sheets-Sheet 2

INVENTOR.
SIGURD WALTER BENGTSSON
BY
*Linton and Linton*
ATTORNEYS

United States Patent Office 3,397,480
Patented Aug. 20, 1968

3,397,480
WINDERS FOR FISHING LINES
Sigurd Walter Bengtsson, Rattgatan 6,
Goteborg V, Sweden
Filed Aug. 30, 1965, Ser. No. 483,555
Claims priority, application Sweden, Sept. 29, 1964,
11,671/64
4 Claims. (Cl. 43—54.5)

ABSTRACT OF THE DISCLOSURE

The invention is concerned with a winder for a fishing line and which winder has substantially the shape of a four sided frame with two resilient sides thereof upon which the fishing line can be wound and a foldable fishing rod attached to said frame.

Figure 1:
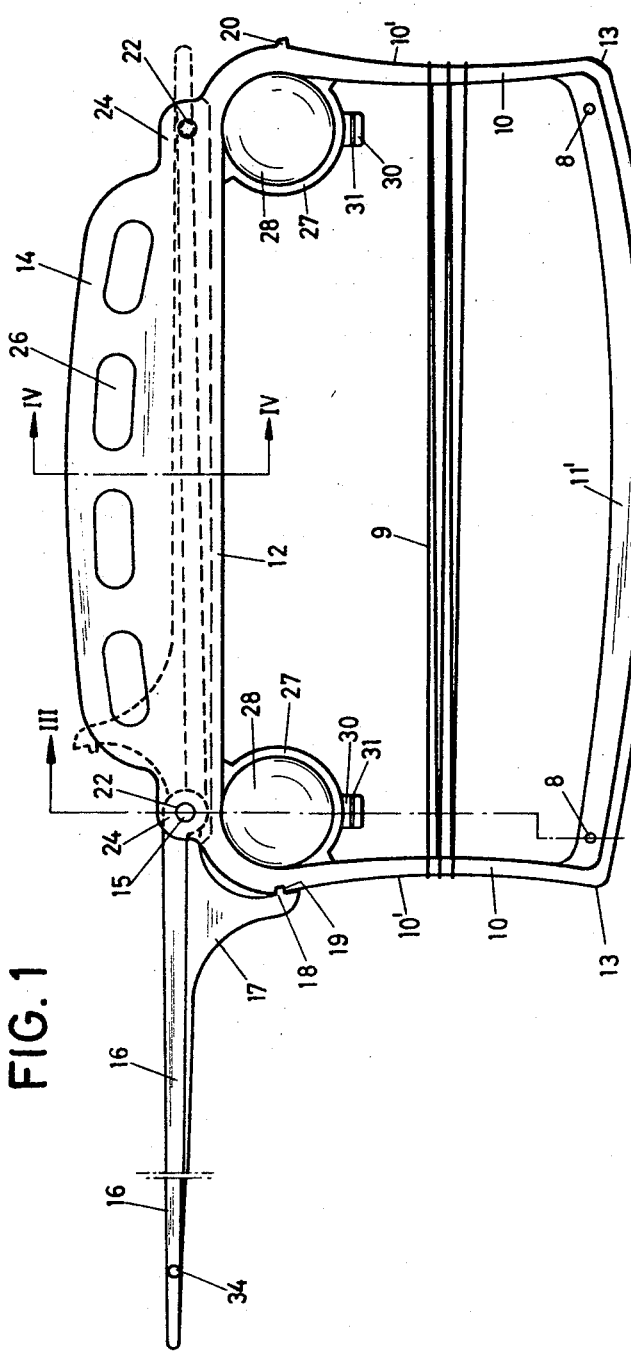

Winders for fishing lines of known types are made from wood and have the shape of a four-sided frame, two opposite side-pieces of this frame projecting past the ends of the remaining two side pieces over which the line is wound. When a wet nylon line is wound over such a winder it is contracted when drying whereby the latter two side pieces will be subject to great stresses resulting in a permanent deformation or, possibly, breaking of these side pieces. The same drawback will, of course, occur if the line is of such a material that it is contracted when wetted and in dry condition is wound on the winder and then is wetted. The invention relates to a winder having substantially the shape of a four-sided frame for a fishing-line designed to be wound over two opposite side-pieces of the frame.

An object of the present invention is to provide a fishing-line winder which will not have the drawback above indicated for known winders.

Another object of the invention is to provide a winder which will serve as a convenient gear for casting of the line having a bait with a hook or hooks at the free end.

Still another object is to provide a fishing-line winder combined with a bobbing-rod in a very practical way, with one of the sides of the four-sided frame also having a handle for said frame as well as for said bobbing-rod.

According to the invention the two opposite side-pieces over which the line is wound are resiliently flexible, the material of the side-pieces being of such a nature that after inward bending of said two side-pieces under the pressure of the line wound thereon, they, by their resilience, practically revert to their original state when said pressure ceases, and that a third of the side-pieces of the frame is formed with a handle. This third side-piece with handle being integral with the firstmentioned two resiliently flexible frame side-pieces. Thus said resilient side-pieces of the frame will not be permanently deformed by the alterations of moisture causing shrinking of the line. As a suitable material for the winder a plastic having the trade name Delrin or a plastic material having similar physical and elastical properties may be used.

As distinguished from known winders, the present winder is also characterized by the fact that the longitudinal axes of the two opposite resiliently flexible frame side-pieces in unloaded state are bent inwardly and that the ends of these side-pieces without corner projections run into the fourth of the side-pieces of the frame. This arrangement has the advantage that when casting out a bait with a hook or hooks in the free end of the line this line will be easily unwound from the winder which in this operation serves as a kind of reel. Preferably, said handle has the shape of a groove, the longitudinal side-walls of which extend along the handle. This form of the handle gives a secure and convenient grasp of the hand holding the winder. Said groove may also receive, when required, a fishing implement such as an artificial bait with a hook or hooks. When not in use, for example when the winder is placed in fisherman's bag, the artificial bait may be placed in the groove 21 of the handle in which position the hook or hooks may engage in the recesses 26 of the handle. Thus the bait and the hooks are never in the groove 21 or attached to the cork when the winder is used in the casting of the bait or the rod 16 is used for its purpose. With advantage, said winder is provided with a bobbing-rod pivotally connected with the handle side-piece in such a manner that said rod from an inoperative position in the groove of the handle is movable to an operative position in which it projects substantially in the longitudinal direction of the last mentioned side-piece.

Figure 2:
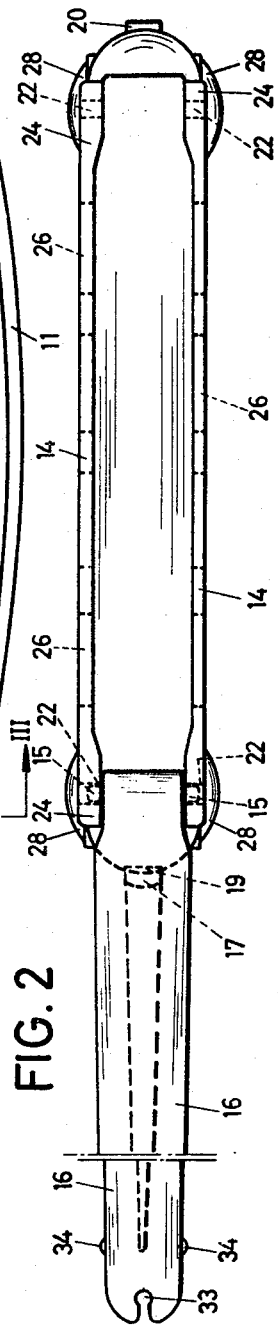
Figure 3:
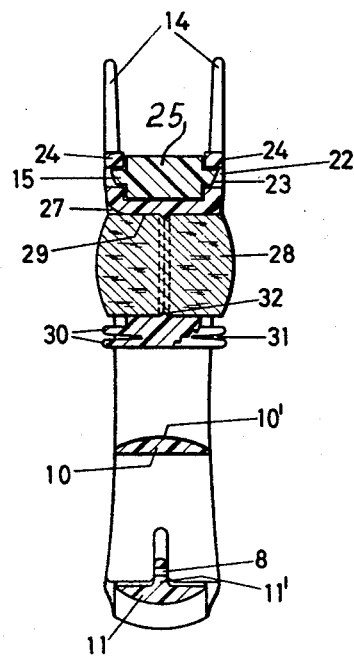
Figure 4:
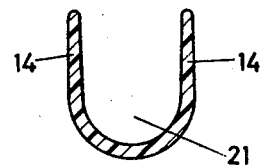

Further features and advantages of the invention will appear from the following description with reference to the accompanying drawings in which FIGURE 1 is a side elevation of the line-winder with the bobbing-rod put out. FIGURE 2 is a top plan view of the winder according to FIGURE 1. FIGURE 3 is a cross-section on the line III—III of FIGURE 1 showing also a cross-section of one of the frame side-pieces over which the line is wound, and FIGURE 4 is a cross-section of the handle side-piece on the line IV—IV of FIGURE 1.

As shown by FIGURE 1 the winder has substantially the shape of a four-sided frame having two resilient side-pieces 10 over which the fishing-line 9 is wound (only a few windings of the line are shown in the drawing). The outwardly facing surfaces 10' of these side-pieces form seats for the wound line and their longitudinal axes are bent inwardly. At their ends these side-pieces are connected by two opposite frame side-pieces 11, 12, the longitudinal axis of the one, 11, of these side-pieces having a gradual curve outwardly while the longitudinal axis of the other side-piece 12 is substantially straight. The frame side-pieces 11, 12 may be more rigid and resistant to bending than the side-pieces 10 of the frame. The frame side-piece 11 has a T-shaped cross-section, and its inwardly projecting web 11' has one or more bores 8 for tying up one end of the line 9. The outer corner between the side-pieces 10 and the side-piece 11 is not defined by outwardly projecting corner portions but the outer surfaces 10' of the side-pieces 10 run over to the outer surface of the side-piece 11 by smoothly curved corner surfaces 13. The frame side-piece 12 is formed with a groove 21 the side-walls 14 of which are resilient and directed outwardly. To one end of the groove at the outside of the frame a bobbing-rod 16 is hinged by a pin 15. From the underside of this rod an arm 17 with a locking projection or detent 18 extends, said projection or detent in the operative position of the rod is adapted to releasably engage in a notch or recess 19 in the outer side of the adjacent side-piece 10. Said notch or recess may be replaced by a locking projection or detent 20 as provided on the opposite frame side-piece 10 in which case the arm 17 would be provided with a recess similar to recess 19 to engage the projection 20. The arm 17 is somewhat resilient and its locking projection 18 is brought into and out of engagement with the recess 19. At its outer end the rod 16 is formed with one or two bosses 34 which, when the rod is folded into the groove 21, will co-operate with holes or apertures 22 in lugs 24 forming extensions of the side-walls 14 of the groove 21. The pin 15 is formed integrally with the rod and has a thickened central portion 25 (FIGURE 3) located between the lugs 24. The end surfaces 23 of the pin form oblique angles with the axis line of the pin so that by utilizing the edge-action of said oblique surfaces, and the resilience of the lugs 24 the pin is movable in the transverse direction of its axis to its bearing position when the axially shortest bearing surfaces of the end portions of the pin are turned downwardly as shown by FIGURE 3. Thus, when the rod 16 is folded to its operative position according to FIGURE 1 the axially longer bearing surfaces of the pin are turned upwardly whereby the pin 15 is retained in its position against downward pull at the outer end of the rod.

In the side walls 14 of the groove 21 openings 26 are provided. The substantial object of these openings is saving of material but they may also, of course, serve for connection of a fishing-hook to the winder by hooking the fishing-hook through one of said openings. In the inner corners between the end portions of the frame side-piece 12 and adjacent end portions of the frame side-pieces 10 seats 27 for cork members 28 or the like are formed. These seats are constituted by cylinder surfaces 29 having one or more preferably annular, inwardly extending projections 32 engaging in and retaining the cork members in their seats. These cork members are designed for connection of the fishing-hook or hooks of the line (not shown). The cork members have by preference outwardly curved end surfaces as shown in FIG. 2, and the point of the hook is stuck through any of said surfaces into the cork member for releasable securing the hook when not in use. The cork members 28 are only used for attachment of the hook or hooks at the end of the line 9, but not intended for spare hooks.

Holding means for the fishing line 9 extend from each of the two seats 27. At each cork seat these holding means comprise two pairs of lips 30 extending in opposite directions, and between these lips a wedge-shaped slot 31 is provided tapering inwardly. These slots are located in planes which are substantially parallel with the longitudinal direction of the frame side-piece 12 or portions of the line 9 running between the frame side-pieces 10. This line may be squeezed between the lips 30 to give the desired length to the portion of the line un-wound for fishing. The squeezing does not cause any injury to the line and also does not cause any sharp bend or kink therein.

Since the frame of the winder is formed without corner projections it is possible to throw out the line to the desired length having a fishing implement such as a hook and bait device at the free end of the line, and in this operation the fisherman by his one finger may exert a pressure on the wound portion of the line to limit the length thereof thrown out. The line is then secured to the holding means 30 as above indicated. If desired, the whole length of the line (about 35 meters) may be thrown out.

When the winder is used as a casting gear for the line, the rod 16 being short can be folded in the groove 21 and its bosses 34 engage with the holes 22 so that the rod is releasably held in the groove 21 as shown by dotted lines in FIGURE 1. Thereupon the user grasps handle 14 in one hand, draws off a portion of line 9 from the winder and casts the same with the bait with the other hand so that additional line 9 is drawn from the winder. When the rod 16 is to be used as a fishing rod it is folded out to the operative position shown by full lines and is releasably secured in this position by the locking means 18–20. The line 9 is drawn from the winder through slot 33 in the extreme end of said rod and after taking the required length of the line from the winder it may be secured to the winder by the holding means 30, 31.

All parts of the line-winder, except the rod and the cork members 28, are formed in one piece of plastic having suitable properties as to strength and elasticity.

The invention is not restricted to the embodiment described with reference to the drawings. For example, the rod 16 instead of being pivotally connected to the handle portion of the winder may be longitudinally slidable into and out of the groove 21 and be locked in relation to the winder in each of its two end positions.

What I claim is:

1. A fishing line winder comprising a winder formed of plastic material having the shape of a four-sided frame for receiving a fishing line to be wound over two opposite side pieces of said frame, the longitudinal axes of said two side pieces being bent inwardly and being resilient so that after inward bending thereof under pressure when the fishing line is wound thereon they will by their resilience revert practically to their original state when said pressure ceases, a third of the side pieces of said frame being substantially straight and forming a handle integral with the first mentioned two side pieces, the ends of said two side pieces merging with the fourth side piece with smoothly curved corner surfaces, said latter side piece and opposite to said third handle forming side piece and integral with the other three side pieces of the winder.

2. A fishing line winder as claimed in claim 1, wherein at least one of the two inner corners between the two resiliently flexible side pieces and said third handle side piece is formed with a seat inside the frame, a member of a material adapted to constitute a fastener for a fishing hook of the line being inserted in said seat.

3. A fishing line winder as claimed in claim 2 wherein the seat has a cylindrical hole for the reception of said member with the inner surface of said hole presenting at least one projection adapted to engage with said member for holding the latter in its position in said seat.

4. A fishing line winder as claimed in claim 2 including means for retaining a desired unwound length of the fishing line, said means comprise a pair of lips, an outwardly open slot being provided between said lips in a plane which is substantially parallel with the longitudinal axis of said third handle forming side piece, said retaining means being formed on said seat inside said frame.

References Cited

UNITED STATES PATENTS

| 2,644,649 | 7/1953 | Gniadecki | 242—104 |
| 1,676,119 | 7/1928 | Tipil | 43—54.5 |
| 1,957,352 | 5/1934 | Patricoski | 43—57.5 |
| 2,222,802 | 11/1940 | Ragsdale. | |
| 2,546,079 | 3/1951 | Seviola | 43—18 |

FOREIGN PATENTS

| 86,085 | 8/1955 | Norway. |
| 94,240 | 7/1959 | Norway. |
| 89,505 | 8/1960 | Denmark. |

SAMUEL KOREN, *Primary Examiner.*

D. J. LEACH, *Assistant Examiner.*